United States Patent
Gao et al.

(10) Patent No.: US 10,318,403 B2
(45) Date of Patent: Jun. 11, 2019

(54) CODE UPDATE BASED ON DETECTION OF CHANGE IN RUNTIME CODE DURING DEBUGGING

(71) Applicant: International Business Machines Corporation, Armonk, NY (US)

(72) Inventors: Jun Hua Gao, Beijing (CN); Cheng Fang Wang, Beijing (CN); Xue Yong Zhang, Beijing (CN); Xi Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 15/156,967

(22) Filed: May 17, 2016

(65) Prior Publication Data

US 2017/0337112 A1    Nov. 23, 2017

(51) Int. Cl.
*G06F 11/36* (2006.01)
*G06F 8/41* (2018.01)

(52) U.S. Cl.
CPC .............. *G06F 11/362* (2013.01); *G06F 8/41* (2013.01)

(58) Field of Classification Search
CPC ................................ G06F 11/362; G06F 8/41
See application file for complete search history.

(56) References Cited

U.S. PATENT DOCUMENTS

| | | | |
|---|---|---|---|
| 6,457,176 B1* | 9/2002 | King | G06F 8/51 717/173 |
| 8,584,102 B2 | 11/2013 | Need et al. | |
| 8,930,923 B2 | 1/2015 | Alanis | |
| 9,720,803 B2* | 8/2017 | Margalit | G06F 11/362 |
| 2005/0034109 A1* | 2/2005 | Hamilton | G06F 8/48 717/140 |
| 2005/0066308 A1 | 3/2005 | Han | |
| 2005/0216895 A1* | 9/2005 | Tran | G06F 11/362 717/127 |
| 2005/0251794 A1 | 11/2005 | Taylor et al. | |
| 2007/0006155 A1* | 1/2007 | Maennel | G06F 11/3664 717/124 |
| 2010/0146481 A1 | 6/2010 | Binder et al. | |

(Continued)

OTHER PUBLICATIONS

Metamon; Cobol/Assembler Testing & Debugging & Testing in 30 Years!, Retrieved on May 17, 2016, Retrieved from: http://www.metamon.com/, 2 pages.

*Primary Examiner* — S. Sough
*Assistant Examiner* — Timothy P Duncan
(74) *Attorney, Agent, or Firm* — Schmeiser, Olsen & Watts LLP; Scott Dobson

(57) ABSTRACT

A method, and associated computer system and computer program product. A change of runtime code is detected by one or more processors of the computer system. The change is detected in a debugging session on a first machine. The runtime code is obtained from source code that is developed on a second machine that is different from the first machine. In response to the change being detected, a portion of the source code associated with the detected change is determined, by the one or more processors, based on a profile. The profile indicates a mapping between the source code and the runtime code. The portion of the source code is caused, by the one or more processors, to be updated based on the detected change in the runtime code.

20 Claims, 4 Drawing Sheets

(56) References Cited

U.S. PATENT DOCUMENTS

2011/0107306 A1* 5/2011 Shah .................... G06F 11/362
                                                                         717/125
2013/0055217 A1   2/2013 Boxall et al.
2015/0058824 A1* 2/2015 Smiljanic ............ G06F 11/3636
                                                                         717/125

* cited by examiner

```
600 ─┐
┌─ Source Code (Before) ──────────────────┬─□─X─┐
│                                                │
│   PGM1_CHECK_ACTION DS    0H                   │
│        MACRO001 LOAD,(R7,BLOCK_A)              │
│   *                                            │
│   *                                            │
│        BZ    PGM1_EXIT                         │
│   *                                            │
│        MACRO002 BIT=ON                         │
│ 530 ─ VALIDATE (PGM1_OPTION1_X)                │
│       ┌──────────────────────────┐             │
│       │ BZ    PGM1_CHECK_STATE   │             │
│       └──────────────────────────┘             │
│        MVC   LOCL_OPTION,PGM1_OPTION1          │
│   PGM1_CHECK_STATE DS   0H                     │
│        ...                                     │
│        ...                                     │
└────────────────────────────────────────────────┘

┌─ Source Code (After) ───────────────────┬─□─X─┐
│                                                │
│   PGM1_CHECK_ACTION DS    0H                   │
│        MACRO001 LOAD,(R7,BLOCK_A)              │
│   *                                            │
│   *                                            │
│        BZ    PGM1_EXIT                         │
│   *                                            │
│        MACRO002 BIT=ON                         │
│ 610 ─ VALIDATE (PGM1_OPTION1_X)                │
│       ┌──────────────────────────┐             │
│       │ BNZ   PGM1_CHECK_ACTION  │             │
│       └──────────────────────────┘             │
│        MVC   LOCL_OPTION,PGM1_OPTION1          │
│   PGM1_CHECK_STATE DS   0H                     │
│        ...                                     │
│        ...                                     │
└────────────────────────────────────────────────┘
```

Fig. 6

CODE UPDATE BASED ON DETECTION OF CHANGE IN RUNTIME CODE DURING DEBUGGING

TECHNICAL FIELD

The present invention relates to changing runtime code in a debugging session on a machine.

BACKGROUND

Debugging is a process for identifying and removing bugs or defects in program code, thereby ensuring that the program will behave as expected. Debugging involves a variety of aspects including, but not limited to, interactive debugging, control flow, integration testing, log files, application or system monitoring, memory dumps, profiling, statistical process control, and special design tactics to improve detection of bugs while simplifying changes.

In some scenarios, the coding and debugging are separated from one another. For example, for a program designed to be executed on a mainframe, conventionally a programmer prepares and compiles source code on a machine such as a personal computer (PC) or a server. Then the compiled code is migrated onto the mainframe platform for debugging, for example, by means of middleware. Due to the separation of coding and debugging, development lifecycle for such programs are generally tedious. If any change is made in the debugging, the programmer has to update the source code manually to keep the change, if desired. This problem also exists in other program developments where the coding and debugging are carried out on different platforms.

SUMMARY

A method, and associated computer system and computer program product, is provided. According to the method, a change of runtime code is detected by one or more processors of the computer system. The change is detected in a debugging session on a first machine. The runtime code is obtained from source code that is developed on a second machine that is different from the first machine. In response to the change being detected, a portion of the source code associated with the detected change is determined, by the one or more processors, based on a profile. The profile indicates a mapping between the source code and the runtime code. The portion of the source code is caused, by the one or more processors, to be updated based on the detected change in the runtime code.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent.

FIGS. 5A-5B show an example of application of the method of FIG. 4, in accordance with embodiments of the present invention.

FIG. 6 shows an example of the method of FIG. 4, in accordance with embodiments of the present invention.

Throughout the drawings, the same or similar reference numerals represent the same or similar elements.

DETAILED DESCRIPTION

Example embodiments of the present invention provide a method, a device, a computer system, and a computer program product for updating source code based on detected changes in runtime code.

The present invention will now be described with reference to some example embodiments. It is to be understood that these embodiments are described only for the purpose of illustration and help those skilled in the art to understand and implement the present disclosure, without suggesting any limitations as to the scope of the disclosure. The invention described herein can be implemented in various manners other than the ones described below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
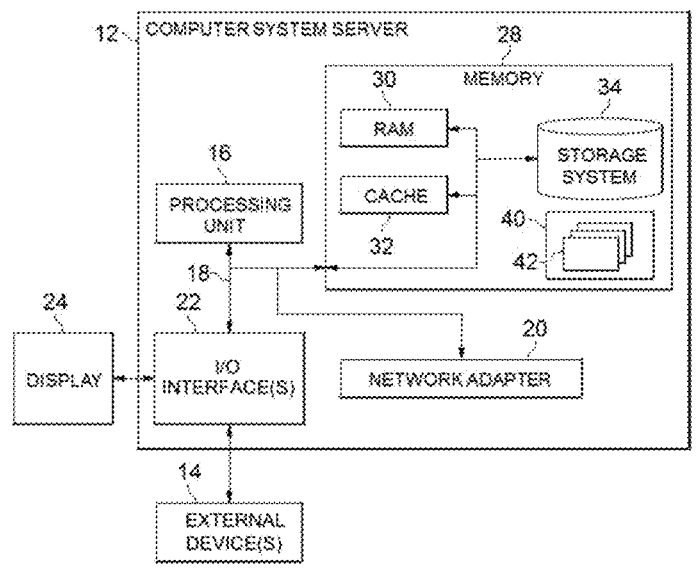
FIG. 1 is a block diagram of an exemplary electronic device or computer system/server suitable for implementing embodiments of the present invention.

FIG. 1 is a block diagram of an exemplary electronic device or computer system/server 12 suitable for implementing embodiments of the present invention. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays. RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
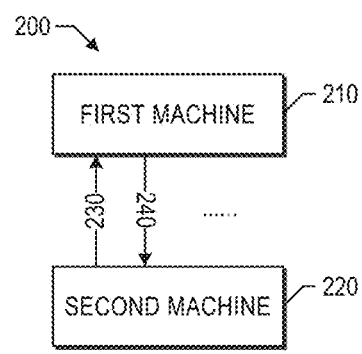
FIG. 2 shows a block diagram of an environment in which embodiments of the present invention can be implemented.

FIG. 2 shows a block diagram of an environment 200 in which embodiments of the present invention can be implemented. The environment 200 includes a first machine 210 and a second machine 220 which differs from the first machine 210. As used herein, the term "machine" may refer to a physical machine, a virtual machine (VM) or any other computing platform. For example, in some embodiments, the first and second machines 210 and 220 are two physical devices. Alternatively, in other embodiments, the first and second machines 210 and 220, respectively, may be implemented as two separated platforms in a single physical device. A user such as a programmer may use the second machine 220 to code and compile source code of a computer program which is designed to be executed on the first machine 210. Since the first machine 210 is the target runtime environment of the program, as known, the code prepared on the second machine 220 should be migrated to the first machine 210 for debugging. That is, in the environment 200, the coding and debugging are separated from one another. In some embodiments, the first and second machines 210 and 220 are heterogeneous platforms. For example, the first machine 210 may be a mainframe and the second machine 220 may a PC or a server computer such as the computer system/server 12 as shown in FIG. 1.

The programmer compiles the source code and deploys 230 the resulting code onto the first machine 210. In the context of the present invention, the code to be debugged on the first machine 210 is referred to as "runtime code." Deployment of the runtime code can be done by use of middleware and/or any other suitable debugging tools. In the debugging session on the first machine 210, the runtime code will usually be modified. For example, the user may change values of the constants, modify the control flow, change content of a memory/storage address, or the like. Conventionally, after the debugging session on the first machine 210 is completed, the programmer updates 240 the source code on the second machine 220 manually, in order to keep the desired changes in the runtime code. The compiling, deploying and debugging are then repeated one or more times. This will result in a tedious development lifecycle.

In accordance with embodiments of the present invention, changes of the runtime code that are made in the debugging session are automatically detected and tracked. For a detected change, its corresponding portion in the source code can be located based on the mapping between the source code and the runtime code. Then the source code can be updated based on the code changes detected in the runtime code. The user can easily validate the updates that the user wants to keep. In this way, efficiency of the debugging can be improved.

Figure 3:
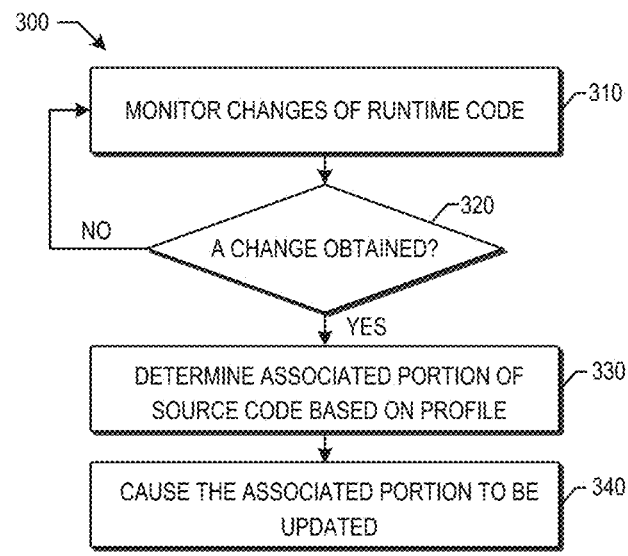
FIG. 3 shows a flowchart of a method for updating source code, in accordance with embodiments of the present invention.

FIG. 3 shows a flowchart of a method 300 for updating source code, in accordance with embodiments of the present invention. In some embodiments, the method 300 may be carried out on the first machine 210 where the debugging is performed. Alternatively, or in addition, the method 300 may be implemented at an entity (not shown in FIG. 2) in communication with the first and second machines 210 and 220.

As described above, the runtime code on the first machine 210 is obtained from the source code which is prepared on the second machine 220. By way of example, in some embodiments, the source code is written in a high level programming language such as C/C++. Alternatively, or in addition, assembly language can be used to develop the source code. The runtime code may be machine code, such as binary code or hexadecimal code, which is generated by compiling the source code. Any techniques of compiling, either currently known or to be developed in the future, can be used in connection with embodiments of the present invention.

As shown, in step 310, the changes of the runtime code in the debugging session on the first machine 210 are monitored. In the debugging session, the user may modify the runtime code in a variety of ways. For example, in debugging the runtime code, if the user finds that an initial value set for a constant or storage address is inappropriate, the user may correct the value of the constant or storage address. Alternatively, or in addition, the user may modify a stop condition for a loop procedure (for example, the number of loops) and thus changes the control flow in the runtime code. Examples of changes in the runtime code that can be monitored in step 310 include, but are not limited to, changes of content in storage/memory addresses, changes of values of constants or variables, changes of control flows, changes of instructions, and/or the like. It is to be understood that these examples are described without suggesting any limitations as to the scope of the present disclosure. Additional and/or alternative changes of the runtime code can be monitored in step 310.

If the method 300 is implemented at the first machine 210, as described above, then any change(s) in the runtime code can be directly detected by the first machine 210. Otherwise, in alternative embodiments where the method 300 is implemented at an entity such as a device remotely located from the first machine 210, the first machine 210 may detect the change in the runtime code and send an indication of the change to the entity.

In step 320, it is determined whether a change is detected or otherwise obtained from the first machine 210. If no change is obtained, the method 300 returns to step 310 to continue monitoring the code change. Otherwise, if it is determined that the runtime code is changed, the method 300 proceeds to step 330. In step 330, a portion of the source code that is associated with the detected change is determined.

In general, in accordance with embodiments of the present invention, the associated portion is determined according to a profile that indicates the mapping between the source code and the runtime code. For example, in those embodiments where the runtime code is obtained by compiling the source code, the profile may be a compiling list which is generated by the compiler. The compiling list records the correspondences between statements in the source code and instructions in the runtime code. For example, for each statement in the source code, the compiling list may indicate one or more instructions in the runtime code which are generated from that statement. In addition, the compiling list can contain any other information or knowledge about the compiling process.

It is to be understood that the profile used in step 330 does not necessarily have to be implemented as the compiling list. This is merely an example without suggesting any limitations as to the scope of the present invention. Other forms of profile are possible as well. For example, in one embodiment, the mapping between the source code and runtime code may be recorded in a script or a file of any other suitable format.

An example implementation of step 330 will now be described with reference to FIG. 4 which shows a flowchart of a method 400 for determining a portion of the source code associated with the detected change in the runtime code, in accordance with embodiments of the present invention. The method 400 is entered in step 410, where a name of a target process is recorded. As used herein, the target process is a piece of code such as a method/function that is being debugged. In step 420, a load point of the target process is recorded. As used herein, the term "load point" refers to the entry address of the target process in the runtime code. In some embodiments, the name and load point of the target process may be recorded in response to the initiation of debugging of the target process, for example. It is to be understood that although step 420 is shown to be carried out after step 410, this is only for illustration without suggesting any limitations as to the order of steps. Step 420 can be carried out prior to or in parallel with step 410.

Next, in step 430, in response to detecting a change in the target process, an offset of the detected change with respect to the load point is determined and recorded. In step 440, the portion in the source code associated with the detected change is determined according to the compiling profile based on the name and load point of the target process as well as the offset of the detected change. For example, given the name and load point of the target process and the offset in the runtime code, an offset with respect to the beginning of the target process in the source code can be determined using the information contained in the profile. Then the associated portion (for example, a statement) in the source code can be located based on this offset in the source code.

Figure 4:
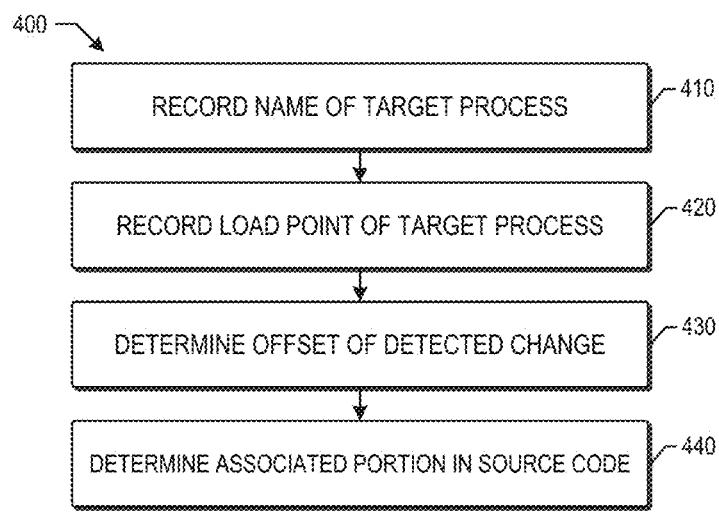
FIG. 4 shows a flowchart of a method for determining a portion of source code that is associated with a detected change in runtime code, in accordance with embodiments of the present invention.
Figures 5A, 5B:
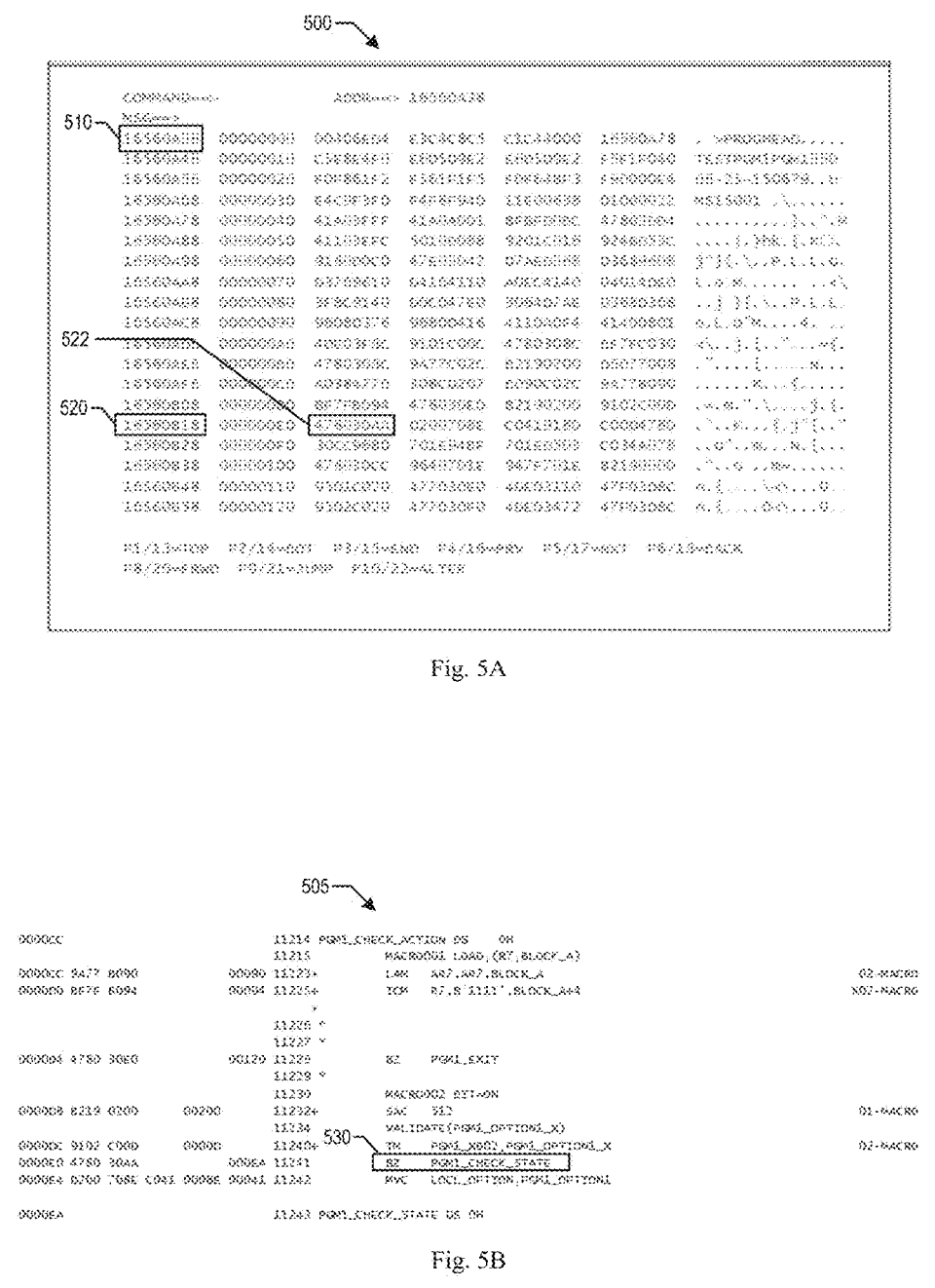

FIGS. 5A-5B show an example of application of the method 400 of FIG. 4, in accordance with embodiments of the present invention. In this example, the runtime code 500 (shown in FIG. 5A) is generated by compiling the source code 505 (shown in FIG. 5B) which is written in the assembly language. Information about the mapping between the source code and the machine code is recorded in the compiling list generated by the compiler. The compiling list, for example, may specify the mapping from each statement in the source code to one or more instructions in the runtime code.

It is assumed that the target process is a method named "TESTPGM1." The load point 510 (that is, the entry address) of the target process is "16560A38," as shown in FIG. 5A. The name "TESTPGM1" and load point "16560A38" are recorded (steps 410 and 420), for example, when the debugging is initiated. If the user changes content at the address 520 "16560B18," the offset of the change with respect to the load point is determined and recorded (step 430.) In some embodiments, it is possible to further record the initial content before the change and the modified content after the change, which will be discussed in the following paragraphs. Then, according to the mapping information specified by the compiling list, the statement in the source code associated with the detected change in the runtime code can be determined (step 440). In this example, the associated statement 530 in the source code 505 is "BZ PGM1_CHECK_STATE," as shown in FIG. 5B.

Still in reference to FIG. 3, after detecting the associated portion in the source code in step 330, the method 300 proceeds to step 340, where the determined associated portion is caused to be updated based on the change in the runtime code which is detected in step 320. For example, the first machine 210 or any other entity implementing the method 300 may communicate with the second machine 220 to cause the source code to be updated.

In some embodiments, in step 340, the determined portion may be updated in a variety of ways, depending on ambiguousness of the portion in the source code. Sometimes, the portion the portion is unambiguous in the source code. That is, a unique update or modification to the target portion in the source code can be exactly determined from the change detected in the runtime code. In this case, a candidate update of the associated portion in the source code may be automatically generated based on the profile and the change in the runtime code.

For the purpose of illustration, an example embodiment will be discussed still with reference to FIGS. 5A-5B. It can be seen from FIG. 5A that the initial content 522 at the address 520 is "478030AA" in this example. It is assumed that the user changes the content to "4780308C" in the debugging. As described above, in some embodiments, the initial content before the change and the modified content after the change are both recorded. By use of the compiling knowledge contained in the profile, it can be determined that the change from "4780" to "4770" in the runtime code is corresponding to a change from "BZ" to "BNZ" in the source code, and the change from "30AA" to "308C" is corresponding to a change from "PGM1_CHECK_STATE" to "PGM1_CHECK_ACTION" in the source code. Accordingly, the candidate update for the statement 530 "BZ PGM1_CHECK_STATE" in the source code 505 is "BNZ PGM1_CHECK_ACTION."

In some embodiments, the candidate update of the associated portion in the source code may be automatically validated and implemented. That is, the target portion in the source code is automatically updated with the generated candidate update, without user intervention. Still considering the above example, the statement 530 "BZ PGM1_CHECK_STATE" may be directly replaced by the candidate "BNZ PGM1_CHECK_ACTION" to obtain a new statement 610 as shown in FIG. 6 which shows an example of application of the method of FIG. 4, in accordance with embodiments of the present invention.

Alternatively, in other embodiments, the candidate update is presented to the user for approval and/or modification. For instance, as shown in FIG. 6, the initial associated statement 530 and candidate update 610 may be both displayed, for example, in an integrated development environment (IDE) 600 so that the user can review, modify, confirm or deny the candidate update. Upon receipt of the user's confirmation, the initial statement 530 may be replaced by the generated new statement 610, thereby validating the update.

In other embodiments, the determined portion in the source code may be ambiguous so that no candidate update can be produced automatically. If so, in step 340, it is possible to only display or highlight the portion in the source code associated with the detected change in the runtime code, without suggesting a candidate update. For example, it is known that a single statement in the source code can be transformed into a plurality of instructions in the runtime code. In this case, when one or more of the plurality of instructions are changed in the runtime code, it is sometimes difficult to exactly determine the update of the source code.

In order to deal with such situation, in some embodiments, the determined portion (for example, the related statement(s) in the source code) may be presented to the user. The user may review the portion and decide how to update the portion. The user may provide an input indicating an update of the portion, and the portion will be updated according to the user's input. In some embodiments, as described above, the initial content before the change and modified content after the change may be recorded. In such embodiments, the initial content and modified content in the runtime code can be also presented to the user. That is, the change itself is presented to the user, which can give the user a "snapshot" of the change to allow the user to correctly update the statement.

The present invention improves the functioning of a computer or computer system by integrating source code and the debugging of runtime code obtained from the source code, wherein the development of the source code and the debugging of the runtime code are carried out on different machines.

The present invention improves Information Technology (IT) by enabling different machines of a computer system to communicate and function more efficiently, by integrating source code and the debugging of runtime code obtained from the source code, wherein the development of the source code and the debugging of the runtime code are carried out on the different machines of the computer system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said comprising:
    receiving, from a second machine by one or more processors of a first machine of a computer system, machine code comprising machine executable instructions, said machine code generated from compilation of source code developed and compiled on the second machine that is different from the first machine;
    executing, by the one or more processors of the first machine, the machine code in a debugging session on the first machine;
    detecting, by the one or more processors of the first machine in the debugging session on the first machine, a change in the machine code;
    in response to the change in the machine code being detected, determining, by the one or more processors of the first machine, a portion of the source code associated with the change in the machine code based on a profile, said profile indicating a mapping between the source code and the machine code; and
    causing, by the one or more processors of the first machine communicating with the second machine, the portion of the source code to be updated on the second machine based on the change in the machine code.

2. The method of claim 1, wherein said causing the portion of the source code to be updated comprises:
    in response to a determination that the portion is unambiguous in the source code, generating a candidate update of the portion based on the profile and the change in the machine code.

3. The method of claim 2, wherein said causing the portion of the source code to be updated further comprises:
    automatically updating the source code with the generated candidate update.

4. The method of claim 1, wherein said causing the portion of the source code to be updated further comprises:

in response to a determination that the portion is ambiguous in the source code, presenting the portion;
receiving an input indicating an update for the portion; and
updating the portion based on the input.

5. The method of claim 4, wherein said causing the portion of the source code to be updated further comprises:
recording initial content in the machine code before the change in the machine code;
recording modified content in the machine code after the change in the machine code; and
presenting the initial content and the modified content with the portion.

6. The method of claim 1, wherein said determining the portion of the source code associated with the detected change in the machine code comprises:
recording a name of a process in the machine code, the detected change in the machine code being determined to be in the process;
recording a load point of the process, the load point indicating an entry address of the process in the machine code;
determining an offset of the detected change in the machine code with respect to the load point; and
determining the portion of the source code associated with the detected change in the machine code, based on the name of the process, the load point of the process, and the offset of the detected change in the machine code.

7. The method of claim 1, wherein the profile includes a compiling list that records at least one mapping between statements in the source code and the machine executable instructions in the machine code.

8. The method of claim 1, wherein the change in the machine code is selected from the group consisting of a change of content in a storage address, a change of a value of a constant or a variable, a change of a control flow, a change of an instruction, and combinations thereof.

9. A computer program product, comprising one or more computer readable hardware storage devices having computer readable program code stored therein, said program code containing instructions executable by one or more processors of a first machine of a computer system to implement a method, said method comprising:
receiving, from a second machine by the one or more processors of the first machine, machine code comprising machine executable instructions, said machine code generated from compilation of source code developed and compiled on the second machine that is different from the first machine;
executing, by the one or more processors of the first machine, the machine code in a debugging session on the first machine;
detecting, by the one or more processors of the first machine in the debugging session on the first machine, a change in the machine code;
in response to the change in the machine code being detected, determining, by the one or more processors of the first machine, a portion of the source code associated with the change in the machine code based on a profile, said profile indicating a mapping between the source code and the machine code; and
causing, by the one or more processors of the first machine communicating with the second machine, the portion of the source code to be updated on the second machine based on the change in the machine code.

10. The computer program product of claim 9, wherein said causing the portion of the source code to be updated comprises:
in response to a determination that the portion is unambiguous in the source code, generating a candidate update of the portion based on the profile and the change in the machine code.

11. The computer program product of claim 10, wherein said causing the portion of the source code to be updated further comprises:
automatically updating the source code with the generated candidate update.

12. The computer program product of claim 9, wherein said causing the portion of the source code to be updated further comprises:
in response to a determination that the portion is ambiguous in the source code, presenting the portion;
receiving an input indicating an update for the portion; and
updating the portion based on the input.

13. The computer program product of claim 12, wherein said causing the portion of the source code to be updated further comprises:
recording initial content in the machine code before the change in the machine code;
recording modified content in the machine code after the change in the machine code; and
presenting the initial content and the modified content with the portion.

14. The computer program product of claim 9, wherein said determining the portion of the source code associated with the detected change comprises:
recording a name of a process in the machine code, the detected change in the machine code being determined to be in the process;
recording a load point of the process, the load point indicating an entry address of the process in the machine code;
determining an offset of the detected change in the machine code with respect to the load point; and
determining the portion of the source code associated with the detected change in the machine code, based on the name of the process, the load point of the process, and the offset of the detected change in the machine code.

15. A computer system, comprising a first machine that includes one or more processors, one or more memories, and one or more computer readable hardware storage devices, said one or more hardware storage device containing program code executable by the one or more processors via the one or more memories to implement a method, said method comprising:
receiving, from a second machine by the one or more processors of the first machine, machine code comprising machine executable instructions, said machine code generated from compilation of source code developed and compiled on the second machine that is different from the first machine;
executing, by the one or more processors of the first machine, the machine code in a debugging session on the first machine;
detecting, by the one or more processors of the first machine in the debugging session on the first machine, a change in the machine code;
in response to the change in the machine code being detected, determining, by the one or more processors of the first machine, a portion of the source code associated with the change in the machine code based on a profile, said profile indicating a mapping between the source code and the machine code; and causing, by the one or more processors of the first machine communicating with the second machine, the portion of the source code to be updated on the second machine based on the change in the machine code.

16. The computer system of claim 15, wherein said causing the portion of the source code to be updated comprises:

in response to a determination that the portion is unambiguous in the source code, generating a candidate update of the portion based on the profile and the change in the machine code.

17. The computer system of claim 16, wherein said causing the portion of the source code to be updated further comprises:

automatically updating the source code with the generated candidate update.

18. The computer system of claim 15, wherein said causing the portion of the source code to be updated further comprises:

in response to a determination that the portion is ambiguous in the source code, presenting the portion;

receiving an input indicating an update for the portion; and updating the portion based on the input.

19. The computer system of claim 18, wherein said causing the portion of the source code to be updated further comprises:

recording initial content in the machine code before the change in the machine code;

recording modified content in the machine code after the change in the machine code; and presenting the initial content and the modified content with the portion.

20. The computer system of claim 15, wherein said determining the portion of the source code associated with the detected change comprises:

recording a name of a process in the machine code, the detected change in the machine code being determined to be in the process;

recording a load point of the process, the load point indicating an entry address of the process in the machine code;

determining an offset of the detected change in the machine code with respect to the load point; and determining the portion of the source code associated with the detected change in the machine code, based on the name of the process, the load point of the process, and the offset of the detected change in the machine code.

* * * * *